United States Patent [19]
Bradley et al.

[11] 3,956,117
[45] May 11, 1976

[54] CATIONIC POLYMERS FOR BREAKING OIL-IN-WATER EMULSIONS

[75] Inventors: Robert L. Bradley, Palos Hills; Anthony J. Sadowski, Naperville; Edward G. Ballweber, Glenwood, all of Ill.

[73] Assignee: Nalco Chemical Company, Oak Brook, Ill.

[22] Filed: Nov. 29, 1974

[21] Appl. No.: 528,513

[52] U.S. Cl. ................................. 210/43; 210/59; 252/358
[51] Int. Cl.² ................................. B01D 5/00
[58] Field of Search .......... 210/43, 59, DIG. 21 C; 252/325, 344, 358

[56] References Cited
UNITED STATES PATENTS

| | | | |
|---|---|---|---|
| 3,004,924 | 10/1961 | Kirkpatrick | 252/344 |
| 3,150,102 | 9/1964 | Kirkpatrick | 252/344 |
| 3,205,169 | 9/1965 | Kirkpatrick | 252/344 |
| 3,756,959 | 9/1973 | Vitalis | 252/358 |

*Primary Examiner*—Charles N. Hart
*Assistant Examiner*—Ernest G. Therkorn
*Attorney, Agent, or Firm*—John G. Premo; Barry W. Sufrin; Robert A. Miller

[57] ABSTRACT

A method of breaking oil-in-water emulsions involving treating such oil-in-water emulsions with a polycationic water-soluble condensation copolymer. Treatment with the copolymer transforms the emulsified oil particles into flocs which may be directly removed or which may be removed after the addition of one or more flocculants.

8 Claims, No Drawings

CATIONIC POLYMERS FOR BREAKING OIL-IN-WATER EMULSIONS

Industrial processes such as machining, lubricating and grinding operations often produce oily waste water in the form of oil-in-water emulsions. These oily waste water emulsions, which typically contain from 100 to 1,000 or more ppm of oil, may not be discharged into waterways without serious ecological consequences. Therefore, effluents containing such emulsions are closely monitored and regulated by environmental agencies. Industrial plants which generate effluents containing oil emulsions are obliged to treat these effluents in a manner which allows their final discharge to meet environmental agencies' standards. Our method of breaking oil-in-water emulsions can be efficaciously employed in treating industrial effluents containing these wastes.

The oil-in-water emulsions, with which we are here concerned, are usually stabilized by a negatively charged surfactant. Certain polycationic electrolytes are capable of neutralizing the negative charge carried by the emulsified oil particles thereby causing the emulsion to become destabilized and to form many small flocs, which may or may not be visible to the human eye. Depending on the nature of the oil, the flocs may be removed at this point by conventional processes like flotation followed by skimming, or filtration. Alternatively, it may be useful or necessary to add other inorganic or organic flocculants before undertaking removal of the oil. In any event, the water which is left behind is generally clear and free of oil and can be discharged, recirculated or reused.

THE INVENTION

A method has been discovered for resolving oil-in-water emulsions through the treatment of these emulsions with a water-soluble condensation copolymer of 1,4-dichloro-2-butene and a lower aliphatic secondary amine. Dispersing this water-soluble copolymer within the emulsion causes the emulsion to break and separate into an aqueous phase and an oil phase. The oil phase may then be removed by conventional methods. In one embodiment of the invention the addition and mixing of the water-soluble copolymer is followed by the addition and dispersal of one or more flocculants. The additional flocculant(s) encourage rapid agglomeration of the flocs and thereby facilitate removal of the oil.

Dosage and pH

The dosage of the water-soluble condensation copolymer of 1,4-dichloro-2-butene and a lower aliphatic secondary amine added to the oil-in-water emulsion may vary between 5 ppm and 1000 ppm by weight. A preferred dosage is between 20 ppm and 50 ppm by weight. Use of the water-soluble copolymer is not confined to a narrow pH range. In a preferred embodiment of the invention the pH of the oil-in-water emulsion will be adjusted to between pH 4 and pH 10 before adding the copolymer.

FIRST EMBODIMENT

In one embodiment of this invention the resolution of the oil-in-water emulsion is accomplished by adding a water-soluble condensation copolymer of 1,4-dichloro-2-butene and a lower aliphatic secondary amine to the oil-in-water emulsion, and mixing to disperse the copolymer within the emulsion. The molecular weight of this copolymer may vary between 2000 and 500,000, though in the preferred embodiment the molecular weight of the copolymer is not less than 10,000.

A useful concentration of the copolymer in the oil-in-water emulsion will be between 5 ppm and 1000 ppm by weight though in the preferred embodiment a concentration of between 20 ppm and 50 ppm by weight is used. Water-soluble condensation copolymers of 1,4-dichloro-butene and a lower aliphatic secondary amine are effective in resolving oil-in-water emulsions over a wide pH range. In a preferred practice of this invention the pH of the oil-in-water emulsion is adjusted to between pH 4 and pH 10 before adding the copolymer.

SECOND EMBODIMENT

In another embodiment of the invention, the dispersal of the water-soluble copolymer within the oil-in-water emulsion is followed by the addition of one or more flocculants. The addition of flocculants hastens the coagulation of the oil products and hence makes for effective separation of the aqueous and oil phases and easier removal of the oil. Inorganic flocculants such as the salts of calcium, zinc, iron, aluminum, or copper, and high molecular weight organic flocculants may be used either alone or in combination.

THE INORGANIC FLOCCULANTS

Illustrative of the inorganic flocculants are such compounds as alum, sodium aluminate, iron sulfate and the like, with alum being preferred. The inorganic flocculants are used at a dosage within the range of 1 ppm up to 3000 ppm. The optimal dosages typically lie within the range of 10–100 ppm by weight of the emulsion treated.

THE WATER SOLUBLE POLYMERIC FLOCCULANTS

The high molecular weight water-soluble polymers which may be used are formed by the polymerization of at least one mono-olefinic compound through an aliphatic unsaturated group. The polymers may be either copolymers or homopolymers and should have a minimum molecular weight of at least 100,000. In a preferred practice of the invention, the molecular weight of these polymers is at least 1 million with molecular weights in excess of 1 million also being suitable for use. In most cases the upper practical molecular weight limit is about 30,000,000. Typically, anionic high molecular weight water-soluble polymers are preferred.

The anionic water soluble polymers of the type generically described are composed of at least 5 percent by weight of at least one monomer which contains an anionic hydrophilic side chain group. Thus the polymers may be said to contain in a side chain grouping such anionic radicals as carboxylic acid, carboxylic anhydride groups, carboxylic acid salt groups, sulfonic acid groups, phosphonus and phosphonic acid and salt groupings.

The most readily prepared polymers that give the best results are the copolymers and homopolymers of acrylic acid which contain at least 5 percent by weight of acrylic acid or acrylic acid salts.

A particularly useful group of copolymers of acrylic acids includes copolymers containing 20–60 percent by weight of acrylic acid, and from 40–80 percent by weight of acrylamide. Such polymers have a preferred molecular weight range between 1–3 million. The preferred polymeric flocculants are prepared from monomers having the molecular grouping:

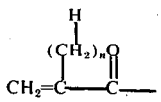

wherin n is an integer from zero (0) to one (1) inclusive.

A useful group of anionic copolymers use the following starting monomers: maleic anhydride, maleic acid, fumaric acid, itaconic acid, aconitic acid, citraconic acid, the partial amides of these acids, the alkali metals (e.g. sodium, potassium and lithium), the alkaline earth metals (e.g. magnesium, calcium, barium and strontium), and ammonium salts of these acids, the partial alkyl esters (e.g. methyl, ethyl, propyl, butyl, mono esters), the salts of said partial alkyl esters, and the partially substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene and/or isobutylene.

Other polymers that may be employed are those polymers which contain, in a side chain grouping, a sulfonic phosphonic or phosphonus acid grouping, either as the free acid or in the form of a water-soluble cationic salt. Illustrative are the well known polystyrene sulfonic acids. Also illustrative are the phosphorolated polystyrenes.

Typical polymers useful as flocculants in this method are: polyacrylic acid-sodium salt, polymethacrylic acid-sodium salt, maleic anhydride-vinyl acetate copolymer, polyvinyl methyl ethermaleic anhydride copolymer, methacrylic acid-acrylamide copolymer, polyacrylic acid, isopropenyl acetate-maleic anhydride sodium salt, itaconic acid-vinyl acetate, methyl styrene-maleic anhydride sodium salt, styrene-maleic anhydride, methylmethacrylate-maleic anhydride sodium salt, acrylic acid-styrene.

These polymers are most suitably used in the form of dilute aqueous solutions whose solution strength ranges between 0.1%-5% by weight. Such solutions are prepared in mixing vessels and then used to treat the aqueous suspensions described.

The polymers are used at a dosage within the range of 0.01 part per million up to dosages not greater than 100 parts per million. In most cases excellent results are obtained when the dosage of the polymer is within the range of 0.05 to 5 parts per million.

DICHLOROBUTENE-DIMETHYLAMINE IONENE CHLORIDE

One of the water-soluble copolymers used in these methods is trans-1,4-dichloro-2-butene-dimethylamine ionene chloride. This polymer has the formula:

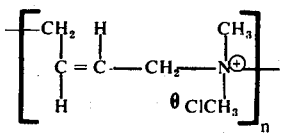

Trans-1,4-dichloro-2-butene-dimethylamine ionene chloride polymer is formed by reacting dimethylamine and trans-1,4-dichloro-2-butene while maintaining the pH below 11, and at a temperature between 45°–50°C. The molar ratio of trans-1,4-dichloro-2-butene to dimethylamine typically will range between 5:1 to 1:5, but is typically 1:1. However, the ratio of these two constituents may go outside this range, and indeed provide a polymer with acceptable application characteristics.

It has been determined that the polymer described above can be cross-linked with ethylene diamine to provide polymers with even higher activity and intrinsic viscosity. The formula weight ratio of polymer to ethylene diamine is between 20:1 to 100:1. These higher intrinsic viscosity ionenes are more active in water clarification than lower molecular weight ionene polymers prepared without cross-linking agents.

Typically, the method of producing these polymers involves adding the amines to the trans 1,4-dichloro-2-butene, followed by the addition of an aqueous solution of sodium hydroxide which is slowly added at a temperature within the range of 30°–60°C, maintaining the pH of the polymer solution at between 9.5 and 10.5. These polymers have intrinsic viscosities within the range 0.04 to 0.85.

As mentioned above, the concentrations and reaction ranges listed are only typical ranges and not intended to limit the polymers of this invention. In order to produce polymers having higher intrinsic viscosity, within the range of 0.6 to 0.75, it has been found that such polymers can be obtained by adjusting any of the following parameters:

A. increase the concentration of dimethylamine;
B. reduce the reaction temperature;
C. maintain a lower pH of the reaction during the sodium hydroxide solution addition by using either a more dilute sodium hydroxide solution and a longer sodium hydroxide solution addition time;
D. a slightly less than theoretical quantity of sodium hydroxide; and
E. use cross-linking agents.

In order to further describe the composition of this polymer, the following examples are provided:

EXAMPLE 1

Preparation of trans-1,4-dichloro-2-butene-dimethylamine ionene chloride: 75 grams of trans-1,4-dichloro-2-butene (0.60m) were placed into a 500 millileter resin flask fitted with a stirrer, dry ice condenser, pH meter, thermometer, and addition funnel. With stirring, 69.3 grams of a 39 percent solution of dimethylamine were added dropwise over a period of 36 minutes at 45°–50°C at a pH below 11. After the addition, stirring was continued for an additional 10 minutes at which time the pH was decreased to about 7.

Forty-eight grams of an aqueous sodium hydroxide solution (50 percent) were then added dropwise at a pH of about 10 while maintaining the temperature at 40°C to provide a polymer solution with the following characteristics:

intrinsic viscosity = 0.25
Brookfield viscosity of 25 percent polymer solution (calculated without chloride ion) = 150 CPS

EXAMPLE 2

Dimethylamine (15.5 percent), 145 grams, were added dropwise with stirring to 62.5 grams of trans-1,4- dichloro-2-butene over a period of 30 minutes at 30°C and at a pH below 11. After the addition, stirring was continued for 10 minutes.

Sodium hydroxide (33.3%), 60 grams, was then added over a period of 140 minutes at about 45°C and at a pH below 11. The polymer, rendered acidic (pH 4.0) with hydrochloric acid (5 g.), gave a polymer solution with an intrinsic viscosity of 0.11.

EXAMPLE 3

Dimethylamine (39 percent), 173 grams, was added dropwise to 187.5 grams of trans-1,4-dichloro-2-butene at 30°–35°C over a period of 60 minutes. After the addition stirring was continued for 10 minutes.

Aqueous sodium hydroxide (28.37 percent), 211.5 grams, was then added at 44±1°C at a pH below 10.0. After the caustic addition the polymer solution was kept at 45°C for an additional 10 minutes, and then diluted with 220.8 grams of deionized water and acidified with 8.0 grams of concentrated hydrochloric acid to a pH of 5–6. The polymer prepared had an intrinsic viscosity of 0.12.

EXAMPLE 4

62.5 grams of the trans-1,4-dichloro-2-butene (0.5 moles) were added to a 4 necked reaction flask fitted with a pH meter, stirrer, thermometer, and an addition funnel. A mixture of 0.18 grams of ethylene diamine (.033 moles) and 36.6 grams of a 60 percent solution of dimethylamine (0.488 moles) was slowly added over a 60 minute period to the trans-1,4-dichloro-2-butene with stirring. The reaction flask was cooled with an ice bath and the temperature was maintained throughout the amine addition at 15 ± 2°C. The maximum pH during the amine addition was kept below 11.0. Upon continued stirring at 20°C for 45 minutes more, the pH of the solution dropped to 7.0. Then 38 grams of a 50 percent aqueous solution of sodium hydroxide were added very slowly, maintaining the pH below 10.0, and the temperature of approximately 20°C, so as to avoid the initial violent exotherm. After the addition of half of the caustic, the reaction temperature was allowed to rise up to about 40°C. After 32 grams of the sodium hydroxide were added, in order to facilitate the fluidity, 10 grams of deionized water were added. Then the caustic addition was continued and upon completion the pH was 10.2. Since the reaction mixture could no longer be stirred, it was left standing for 30 minutes and a drop in pH to 8.5 was noted. 185 grams of deionized water were added and the mixture was kept stirred for 30 minutes to form a solution. 1.5 grams of concentrated hydrochloric acid were added to render the solution acidic at a pH of 3.0. The polymer had an intrinsic viscosity of 0.75.

EVALUATION OF THE INVENTION

EXAMPLE 5

The pH of an oily waste water emulsion from an auto plant, initially at about pH 9 was adjusted by the addition of dilute hydrochloric acid to pH 5.5. Dosages ranging between 20 ppm and 100 ppm by weight of 1,4-dichloro-2-butene-dimethylamine ionene chloride condensation copolymer with an intrinsic viscosity of 0.12 were added. Addition of the copolymer was followed by 10 minutes of mixing. Alum was then added followed by 3 minutes of mixing. Finally an acrylamide, 40 percent by weight sodium acrylate, copolymer having a molecular weight of at least a million was added, followed by ten more minutes of mixing. Absorbance readings were then taken after letting the mixture stand for ten minutes to determine the extent of the resolution of the oil-in-water emulsion. Good resolution was noted for concentrations of the dichlorobutene dimethylamine copolymer between 35 ppm and 80 ppm.

EXAMPLE 6

The same procedure was followed as set forth in Example 5, except that the initial pH was adjusted to pH 7. Satisfactory resolution was found upon the addition of between 32 ppm and 42 ppm of the dichlorobutene dimethylamine copolymer.

EXAMPLE 7

The same procedure as that described in Example 5 was followed except that the initial pH was adjusted to pH 8.5. The resolution of the oil-in-water emulsion, as indicated by measure of percent absorbance, was good for concentrations of dichlorobutene dimethylamine copolymer between 32 ppm and 44 ppm.

In conclusion, the method disclosed in this invention reveals a new and useful means of resolving oil-in-water emulsions through the use of a water-soluble condensation copolymer of 1,4-dichloro-2-butene and a lower aliphatic secondary amine, used either alone or in conjunction with one or more flocculating agents.

We claim:

1. A method for resolving oil-in-water emulsions which comprises the steps of:
   A. Treating said emulsions with at least 5 ppm and not more than 1000 ppm by weight of a water-soluble condensation copolymer consisting essentially of 1,4-dichloro-2-butene and dimethylamine,
   B. Mixing said water-soluble copolymer with the emulsions for a period of time sufficient to break the emulsion whereby a separate and distinct aqueous phase and oil phase is produced, and then,
   C. Separating the oil phase from the aqueous phase.

2. The method of claim 1 wherein the concentration of the water-soluble copolymer lies between 20 ppm by weight, and its molecular weight is at least 2000.

3. The method of claim 2 wherein the pH of the mixture lies between pH 4 and pH 10.

4. The method of claim 2 wherein the pH of the mixture lies between pH 4 and pH 10.

5. The method of claim 2 wherein the concentration of the water-soluble copolymer lies between 20 ppm and 50 ppm and the molecular weight of the water-soluble copolymer is at least 2000.

6. The method of claim 1 wherein the pH of the mixture lies between pH 4 and pH 10.

7. A method for resolving oil-in-water emulsions which comprises the steps of:
   A. Treating said emulsions with at least 5 ppm and not more than 1000 ppm by weight of a water-soluble condensation copolymer consisting essentially of 1,4-dichloro-2-butene and dimethylamine,
   B. Adding one or more flocculants to the mixture of said water-soluble copolymer and said emulsion and mixing for a period of time sufficient to break the emulsion whereby a separate and distinct aqueous phase and oil-containing phase is produced, and then,
   C. Separating the oil-containing phase from the aqueous phase.

8. The method of claim 5 wherein the pH of the mixture lies between pH 4 and pH 10.

* * * * *